United States Patent [19]

Seligman et al.

[11] Patent Number: 5,199,372
[45] Date of Patent: Apr. 6, 1993

[54] AMPHIBIOUS VEHICLE

[75] Inventors: Bruce H. J. W. Seligman, Surrey; Raymond G. Wall, Vancouver, both of Canada

[73] Assignee: Watercraft Offshore Canada Ltd., Richmond, Canada

[21] Appl. No.: 616,234

[22] Filed: Nov. 20, 1990

[51] Int. Cl.⁵ .............................................. B63B 35/00
[52] U.S. Cl. ................................................... 114/270
[58] Field of Search ................ 114/270, 344; 280/700, 280/701, 702, 704

[56] References Cited

U.S. PATENT DOCUMENTS

| | | | |
|---|---|---|---|
| 1,002,661 | 9/1911 | Erikson | 114/270 |
| 2,876,466 | 3/1959 | Baldwin | 114/344 |
| 2,908,241 | 10/1959 | Todd | 114/270 |
| 3,079,616 | 3/1963 | Byberg | 114/344 |
| 3,599,256 | 8/1971 | Carroll, Jr. | 114/344 |
| 4,892,055 | 1/1990 | Schad | 114/219 |

Primary Examiner—Jesus D. Sotelo
Attorney, Agent, or Firm—Bull, Housser & Tupper

[57] ABSTRACT

An amphibious vehicle has a body with front and rear portions, opposite sides and a bottom. The vehicle includes at least one pair of wheels, each wheel being located adjacent a respective side, and a wheel mounting structure for moving the respective wheel between raised and lowered positions thereof. Thus, when the wheels are in the raised position, lower portions of the wheels are raised above the bottom, providing clearance when the vehicle is used in water, and when in the lowered position thereof, the lower portions of the wheels are below the bottom to support the vehicle on a bearing surface. Preferably, the vehicle has two pairs of wheels, and each pair can be moved independently of the remaining pair. For some uses, the wheels of each pair could be moved independently of each other.

22 Claims, 4 Drawing Sheets

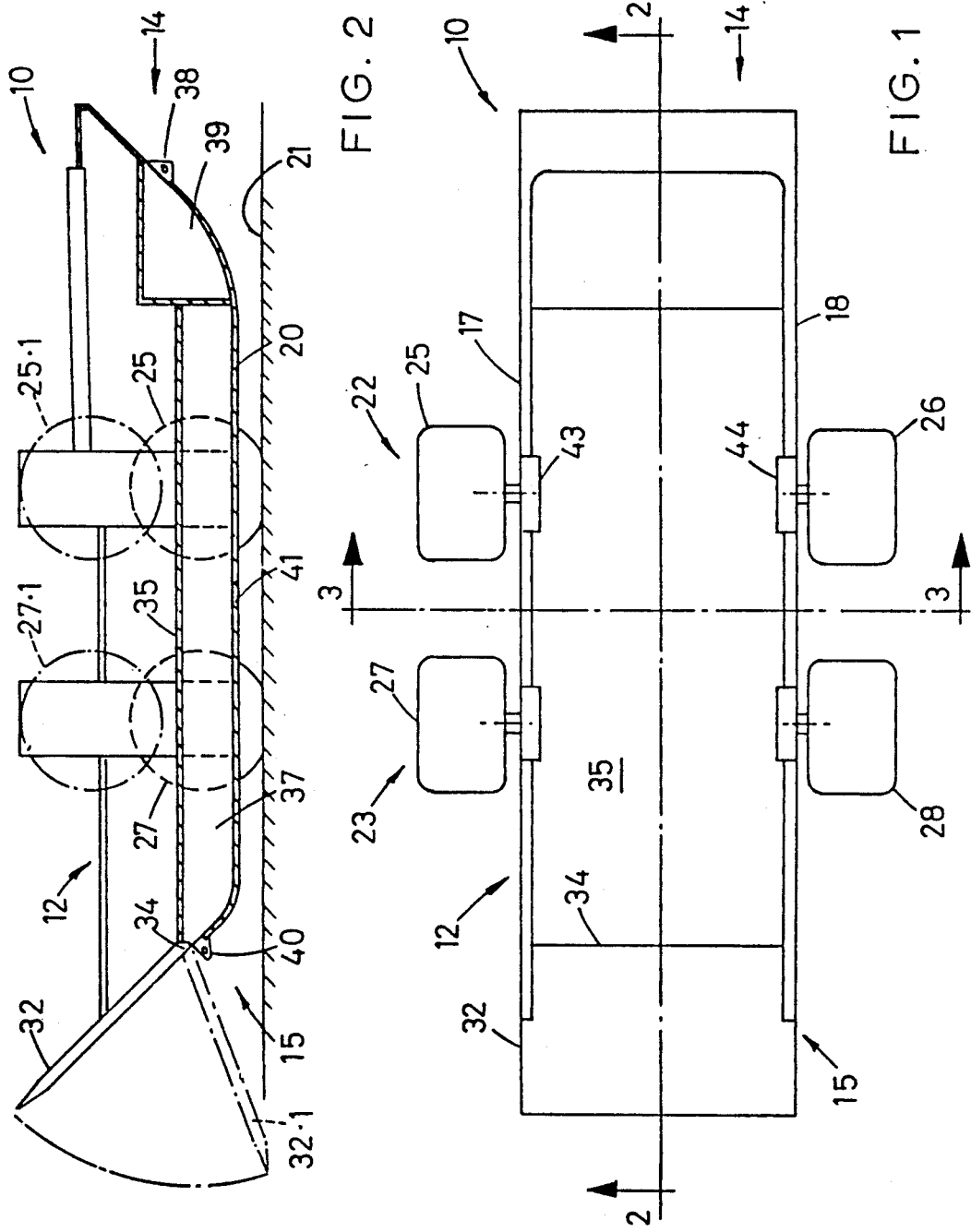

AMPHIBIOUS VEHICLE

BACKGROUND OF THE INVENTION

The invention relates to an amphibious vehicle having wheels which can be raised, permitting the vehicle to operate on land and other bearing surfaces, and also in water, and water containing floating debris such as ice, muskeg, etc..

There are many amphibious vehicles designed to operate on land and water, and some vehicles are also designed to operate in other, soft bearing surfaces such as mud, snow, ice, muskeg, and other harsh environments. Some amphibious vehicles are fitted with wheels for use on land, and, when the vehicle is used on water, the wheels increase drag considerably and often contribute little to flotation. In some vehicles, the wheels project outwardly from sides of the vehicle, and this generally increases drag more than wheels that project below the vehicle. However, outwardly projecting wheels are desirable in some circumstances to increase stability of the vehicle on land, and also permit use of relatively wide tires to decrease ground pressure. While a decrease in ground pressure is desirable for use on soft surfaces, the loss in water performance from wide tires is usually considerable due to increased drag.

Some vehicles are self propelled, while others require towing by another powered vehicle or tractor unit, which usually is adapted to provide propulsion for the different surfaces to be encountered. One such vehicle is disclosed in U.S. Pat. Nos. 4,645,023 and 4,934,300, and is particularly adapted for use on soft surfaces e.g. ice, and snow, and also water. Such a vehicle can be used as a tug boat for towing floating barges, but such barges do not traverse land. Similarly, the potential vehicle can be used to tow sleds across snow or ice, or to tow wheeled trailers on hard surfaces, but the sleds or trailers cannot operate in water. Thus, the use of the above patented vehicle as a towing tractor is limited by load carrying trailers and the environment for which they were designed.

Consequently, there is a need for a load carrying trailer which can function in the same environment as the patented towing vehicle, that is to be able to traverse hard surfaces, soft surfaces or water, thus increasing the versatility of the combination of vehicles.

SUMMARY OF THE INVENTION

The invention reduces the difficulties and disadvantages of the prior art by providing a vehicle which can operate in essentially all environments that the tractor can operate in, namely hard and soft surfaces, snow, ice and water. While the invention is particularly envisaged for use with a towing vehicle or tractor of the type shown in the aforementioned U.S. patents, other tractor vehicles are envisaged, such as amphibious tanks, large wheeled tractors, etc. Furthermore, the present invention is adapted to reduce drag when the vehicle is used in water by positioning the ground bearing wheels so as to avoid contact with the water in relatively calm conditions. However, if the water conditions become threatening, the wheels can be lowered to another position to reduce rolling and pitching of the vehicle by providing additional flotation. Where speed is not a major consideration, extra buoyancy can be obtained by lowering the wheels to their lowest position with respect to the body, so as to increase displacement so as to increase weight carrying capacity of the vehicle.

An amphibious vehicle according to the invention comprises a body, at least one pair of wheels, and respective wheel mounting means. The body has front and rear portions, opposite sides and a bottom. Each wheel is located adjacent a respective side, and the wheel mounting means are for moving the respective wheels between raised and lowered positions thereof. Thus, when the wheels are in the raised position, lower portions of the wheels are raised above the bottom of the vehicle. On the other hand, when the wheels are in the lowered position, the lower portion of the wheels are below the bottom and thus can support the vehicle on a hard surface.

Preferably, the wheels are mounted for movement along generally vertically disposed guide axes, and preferably the vehicle has at least four wheels. Each wheel mounting means includes a guide means, a support means and an actuating means. Each side of the body has a guide means for guiding the respective wheel. Each wheel has a support means for mounting the wheel for rotation relative thereto. The support means cooperates with the guide means for movement therealong between raised and lowered positions of the wheel. The actuating means is for moving the support means along the guide means between the raised and lowered positions, and cooperates with the body and the support means. Preferably, each guide means comprises a recess within the respective side of the body, and the support means comprises a carriage fitted within the recess, and a wheel journalling means cooperating with the carriage to permit rotation of the wheel relative to the carriage.

Preferably, the bottom of the vehicle is completely covered with a low friction, high wear resistant plastic composition, which permits the vehicle to be dragged over rough terrain, and is also used when the wheels are raised to reduce ground pressure by spreading load of the vehicle over a large area. Minimum ground pressure is attained by positioning lower surfaces of the wheels so that some load is carried on the wheels, and some load on the bottom. This is particularly advantageous in environmentally sensitive terrain. Furthermore, preferably each wheel is movable independently of the others, and also as pairs, and thus one end of the vehicle can be raised to permit dumping from a lower end of the vehicle.

A detailed disclosure following, related to drawings, describes a preferred embodiment of the invention which is capable of expression in structure other than that particularly described and illustrated.

DESCRIPTION OF THE DRAWINGS

FIG. 1 is a simplified top plan of an amphibious vehicle according to the invention, a loading ramp thereof being shown in a raised position, FIG. 2 is a simplified section on Line 2—2 of FIG. 1, showing wheels thereof partially in full outline in a lowered position, and in broken outline in a raised position, the loading ramp being shown in full outline in a raised position, and in broken outline in a lowered position.

DETAILED DISCLOSURE

FIGS. 1–3

Figure 3:
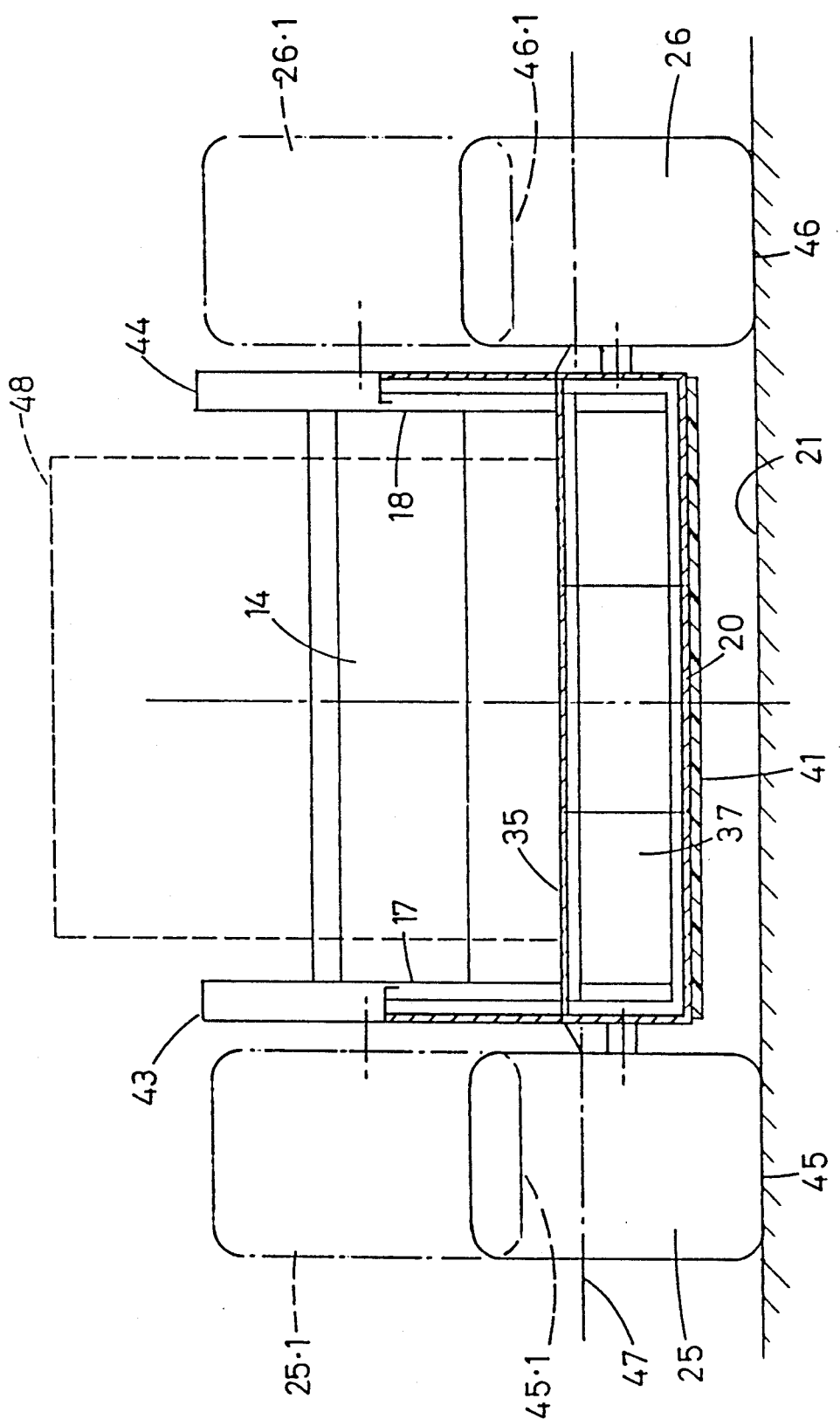
FIG. 3 is a simplified transverse section on Line 3—3 of FIG. 1 showing the wheels in full outline in a lowered position, and in broken outline in a raised position.
Figure 4:
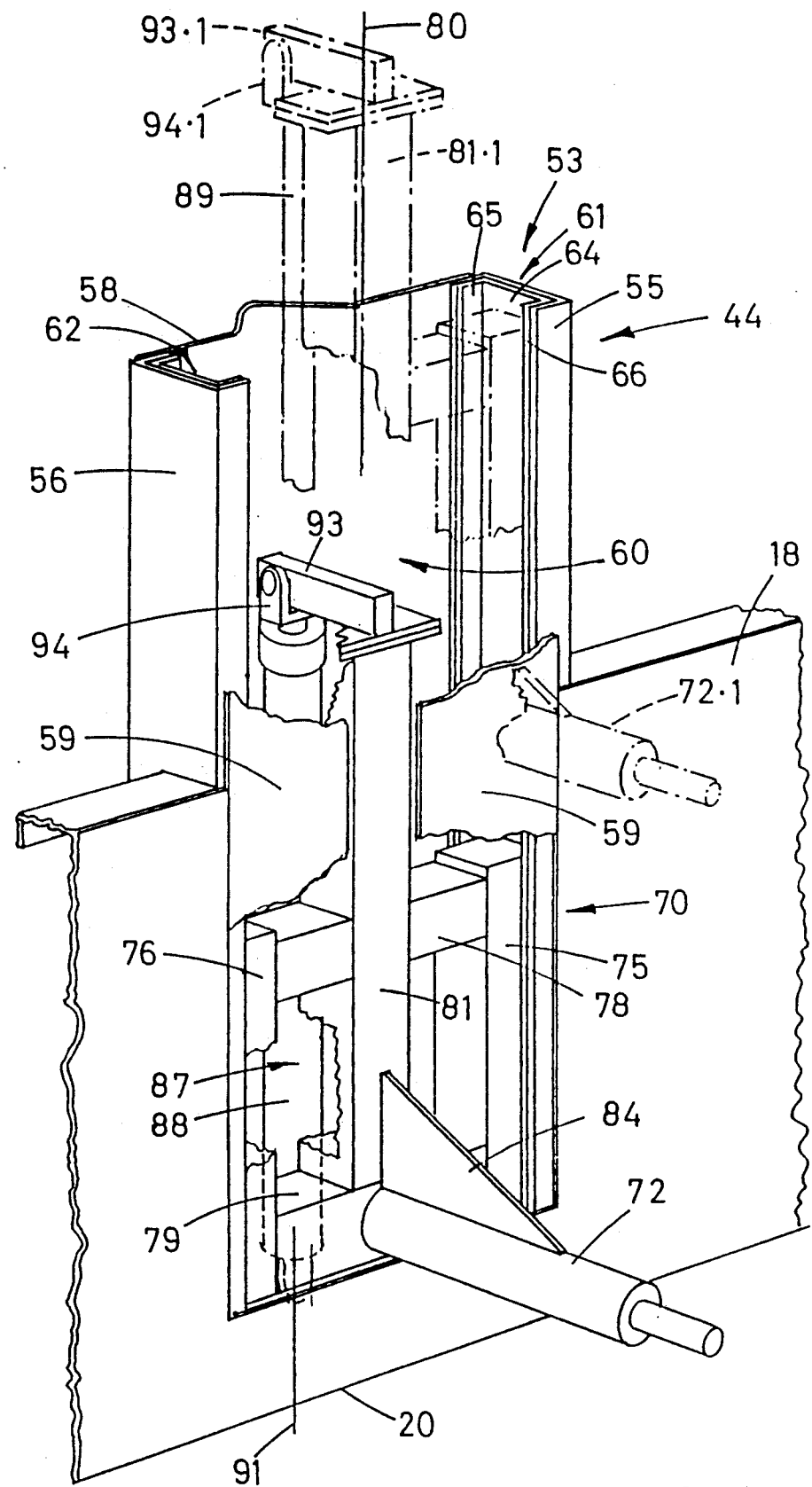
FIG. 4 is a simplified fragmented isometric of a first embodiment of wheel mounting means, being shown partially in full outline in a lowered position, and partially in broken outline in a raised position.
Figure 5:
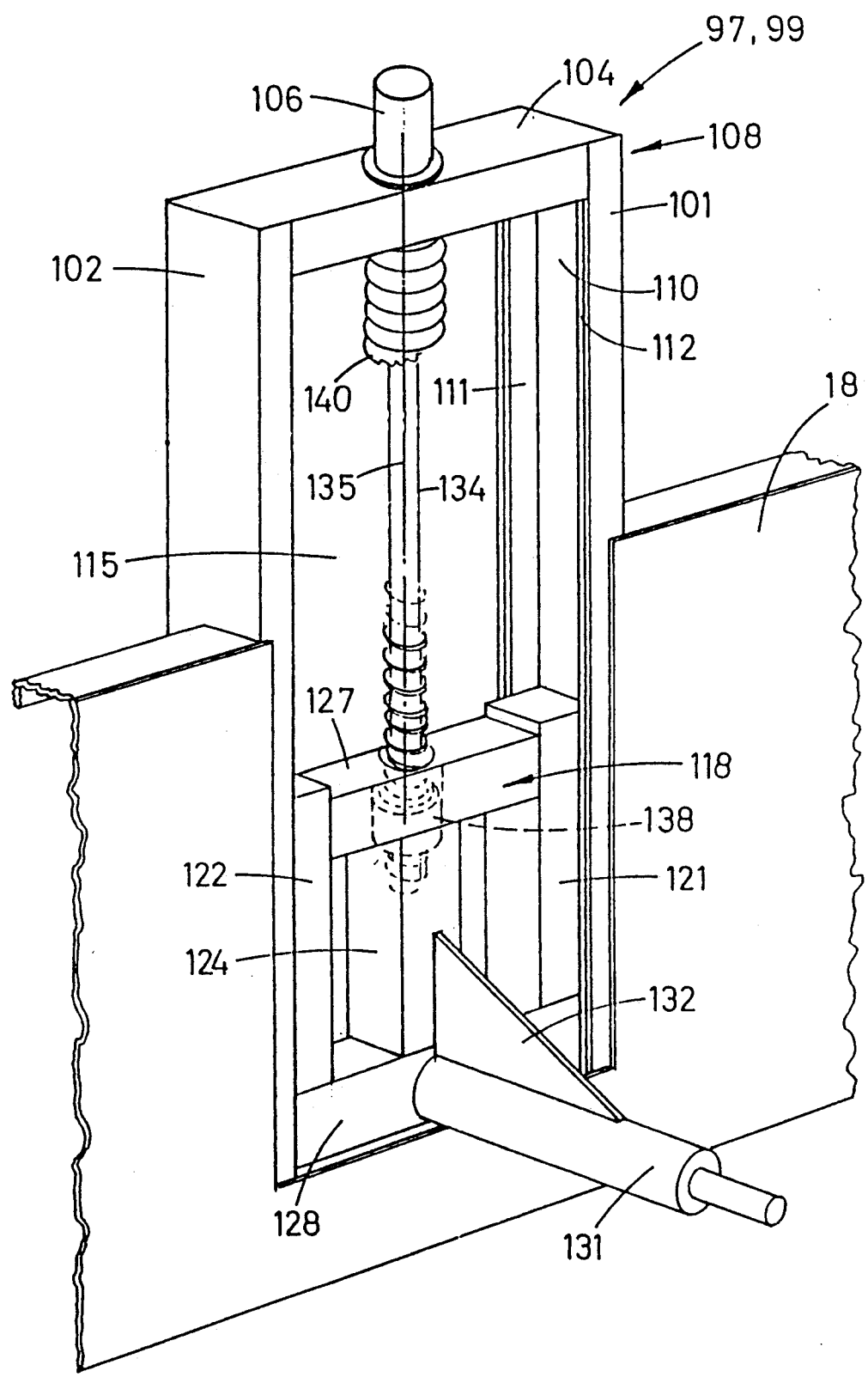
FIG. 5 is a simplified fragmented isometric of a second embodiment of wheel mounting means shown in full outline in a lowered position.

An amphibious vehicle 10 according to the invention has a body 12, front and rear portions 14 and 15, and oppositely disposed left-hand and right-hand sides 17 and 18 respectively. The vehicle has a flat bottom 20, and the front and rear portions are inclined upwardly and longitudinally outwardly so as to resemble the hull of a military landing craft.

The vehicle includes front and rear wheel pairs 22 and 23 respectively, two wheels being shown in FIGS. 2 and 3 in full outline in a lowered position in contact with a hard surface 21 supporting the weight of the vehicle. The front wheel pair 22 comprises left-hand and right-hand front wheels 25 and 26, and the rear wheel pair 23 comprises left-hand and right-hand rear wheels 27 and 28 respectively. Preferably, the wheels are fitted with relatively large all-terrain flotation tires, which, for a vehicle having a length of approximately 12 meters (40 feet), and a beam or width of about 4 meters (12 feet) would be approximately 1.6 meters (66 inches) in diameter and 1.1 meters (44 inches) wide.

The rear portion 15 of the vehicle has a loading ramp 32 having a hinge 34 along a forward edge thereof to hinge the ramp to the body to permit swinging between a raised position, shown in FIG. 2 full outline, and a lowered position, shown in broken outline at 32.1. To facilitate loading and unloading, the hinge is disposed generally level with a cargo deck 35, which is spaced above the bottom 20 of the hull to provide a plurality of flotation compartments 37 therebetween. A forward compartment 39 of the hull is adjacent the front portion 14 of the vehicle and houses a hydraulic power-pack (not shown) to provide hydraulic power as will be described. Front and rear towing eyes 38 and 40 are fitted adjacent the front and rear portions 14 and 15 respectively. The bottom 20 is completely covered with panels of a low friction, high wear resistant plastic sheathing 41, such as UHMW polyethylene, which is typically about 3 cms (1.5 inches) thick. The sheathing 41 permits the vehicle to be pulled over ice, snow and other rough terrain and reduces drag, wear and impact damage that would otherwise occur.

As best seen in FIGS. 1 and 3, the wheels 25 and 26 are carried on wheel mounting means 43 and 44 adjacent the sides 17 and 18 respectively. The wheel mounting means are provided for moving the wheels between raised and lowered positions thereof which is an important aspect of the present invention. Thus, when the wheels 25 and 26 are in the lowered position, lower portions 45 and 46 of the wheels 25 and 26 respectively are below the bottom 20 and in contact with the surface 21 supporting the vehicle thereon. When the wheels are in the raised positions thereof, the lower portions 45.1 and 46.1 of the wheels 25 and 26 respectively are raised above the bottom 20 of the body to provide clearance for water, or ice on water. The means 43 and 44 are similar, and likewise the rear wheel pair 23 are similarly mounted on respective wheel mounting means. Each wheel can be raised or lowered independently of the remaining wheels, and this has many advantages as will be described. For some applications, the wheels of a pair can be raised together which also provides advantages.

A water line 47 for a normally loaded vehicle is about 30 cms (12 inches) below the lower portions 45.1 and 46.1 of the wheels when fully raised. The wheels can be lowered partially to increase resistance to rolling or pitching in adverse sea states with only a small increase in drag. If extra buoyancy is required to carry a heavy load, and the distance to be travelled is relatively short such that speed is not a major consideration, additional buoyancy can be obtained by lowering the wheels to their lowest position to increase displacement. Also with a poorly balanced load, because the wheels can be operated independently of each other, trim of the vehicle can be improved by selectively lowering wheels adjacent one end or one side of the vehicle. This would selectively increase flotation as required to assist in trimming the vehicle.

In FIG. 3, a transverse cross-section of a standard twenty foot cargo container as used on marine vessels and road vehicles is shown in broken outline at 48 to provide an indication of the size of the body and its utility for transporting standard containers.

FIG. 4

The wheel mounting means 44 adjacent the side 18 will now be described in detail. As previously stated, the remaining wheel mounting means are essentially similar and thus will not be described.

The wheel mounting means 44 includes a guide means or guide frame 53 having similar front and rear guide members 55 and 56 of U-sectioned channel facing longitudinally of the vehicle and towards each other. A vertical inner wall portion 58 extends between inner flanges of the guide members, and co-planar outer wall portions 59 extend between outer flanges of the guide members so as to define a recess 60 between the wall portion 58, the two wall portions 59, and the guide members 55 and 56. It can be seen that the recess is defined in part by oppositely facing generally U-sectioned guide walls 61 and 62 of the guide members 55 and 56. The guide wall 61 has a transversely disposed central wall 64, and a pair of oppositely facing longitudinal side walls 65 and 66 on inner faces of the flanges as shown.

The wheel mounting means 44 also comprises a carriage 70 fitted within and movable vertically in the recess 60, and a wheel stub axle 72 serving as a wheel journalling means and cooperating with the carriage to permit rotation of the wheel relative to the carriage. In this embodiment the wheels are non-powered and thus are mounted for free rotation in sealed bearings on the axle 72. The carriage 70 comprises vertically disposed, parallel, front and rear bearing members 75 and 76 cooperating with the front and rear guide walls 61 and 62 to permit vertical sliding movement therein. Upper and lower spacer members 78 and 79 respectively extend between upper and lower portions of the bearing member 75 and 76 to define a generally rectangular frame. Clearly, the two parallel bearing members have an outer shape generally complementary to the respective U-sectioned guide walls so as to permit longitudinal movement of the carriage along a vertical guide axis 80 of the recess, with negligible rocking or twisting motion, thus reducing chances of binding. Preferably, the guide walls 64, 65 and 66 and the oppositely facing guide walls are fitted UHMW polyethylene sheathing to reduce friction and wear therebetween. Alternatively, the UHMW polyethylene sheathing can be fitted on the guide members.

A central member 81 is disposed mid-way between the bearing members 75 and 76 and parallel thereto, and is connected to the spacer members 78 and 79 to provide a centrally located mounting for the stub axle 72. The central member 81 extends upwardly beyond the upper spacer member 78 to provide location for and to accommodate sufficient stroke of an actuator as will be described. A strengthening gusset 84 extends between the stub axle 72 and the central member 81 to reduce deflection of the axle.

As previously stated, the outer wall portions 59 extend between the guide members 55 and 56 so as to partially enclose an outer face of the recess 60. Inner edges of the wall portions 59 are spaced apart to provide a clearance slot to permit the stub axle 72 to protrude therethrough and to move between upper and lower positions thereof, the upper position being shown in broken outline at 72.1.

The wheel mounting means 44 further includes a hydraulic cylinder 87 having a cylinder body 88 and a piston rod 89 extensible of the body along an actuator axis 91. The body 88 is positioned below the rod and secured to the body 12, so as to permit the rod to extend upwardly and vertically therefrom to raise the wheel, and to be retracted into the body 88 to lower the wheel. A connecting means 93 extends from an outer end 94 of the rod outwardly to engage an upper portion of the central member 81 of the carriage means. The guide axis 80 of the carriage means and the actuator axis 91 are parallel, so that actuation of the rod moves the carriage means with respect to the guide axis. It is noted that the piston rod 89 is positioned relative to the body 88 so as to extend upwardly therefrom. This is to position the rod as high as possible to reduce contamination of the rod when the rod is extended from the cylinder. Clearly, the hydraulic cylinder is selected so as to be resistant to contamination from sea water, and other aspects of the harsh operating environment. Hydraulic supply hoses, and associated valves for controlling and supplying fluid to the cylinder 87 from the hydraulic power pack are provided, but these are not shown and are well known to persons skilled in the art. The controls can be located in the towing vehicle for convenience, preferable communicating by radio thus permitting remote actuation of the wheels.

It can be seen that the guide members 55 and 56 provide a guide means comprising the recess 60 within a respective side of the body, and the carriage 70 serves as a support means for mounting the wheel for rotation relative thereto. The support means cooperates with the guide means for movement therealong between raised and lowered positions of the wheel. Clearly, the hydraulic cylinder 87 serves as an actuating means for moving the support means along the guide means between the raised and lowered positions, the actuating means cooperating with the body and the support means.

OPERATION

Preferably, one or more amphibious vehicles 10 according to the invention are towed by the aforementioned patented vehicle, so as to be able to traverse essentially all terrain that the patented vehicle can traverse. When traversing hard surfaces, the wheels are lowered to the lowermost position, so as to reduce rolling resistance and drag. When the vehicle is required to traverse very soft snow, mud or muskeg, the wheels can be raised, and the full weight of the vehicle can be borne on the low friction plastic coated bottom 20, thus acting as a sled. Clearly, the wheels can be raised quickly and remotely, and there is no requirement for the operator to move around the vehicle trying to locate jacks, etc. When the vehicle slides on the bottom 20, a relatively low ground pressure or bearing pressure is attained, but an even lower ground pressure can be attained by spreading the load between the bottom and the wheels. This is attained by lowering the wheels slightly so that some of the weight of the vehicle is carried on the wheels, while the remaining portion is carried on the bottom. As the wheels can be set to any position between fully raised and fully lowered, a nice balance of load sharing can be attained between the wheels and the bottom for a wide range of surface conditions.

On a relatively smooth surface, e.g., firm mud flats, etc., the wheels can be raised slightly to reduce ground clearance, thus increasing stability of the vehicle.

When the vehicle 10 is towed on a relatively hard surface, a relatively short length of towing cable extends between the towed vehicle 10 and the towing vehicle to improve control. Preferably, the actuation of the controls in the towed vehicle 10 is by radio, and thus the only connection between the two vehicles is the towing cable. When the vehicle is towed on water as a barge, following normal practice, a longer towing cable is required, and this can be easily attained by paying out more cable between the vehicles. Clearly, because of the radio communication between the two vehicles, there is no difficulty in controlling the height of the wheels should sea states vary. In most circumstances, it would be possible for the towing vehicle to perform the transition between water and land and vice versa without stopping, and by raising and lowering the wheels as required as the vehicle moves from one medium to the other.

When traversing ice on water, it has been found that the patented vehicle tends to break through ice less than 30 cms (12 inches) thick. Thus, when towing the vehicle 10 through breakable ice, it is important that the wheels can be raised so as to be clear of the ice, thus reducing drag and unnecessary tire wear. Consequently, height of the lowest portions 45.1, 46.1 (FIG. 3) of the wheels above the water line 47 should be at least the maximum thickness of ice that requires clearance, namely approximately 30 cms.

For other applications, the vehicle 10 can be used as a self-dumping trailer as follows. The ramp 32 is lowered, the rear wheel pair 23 is fully raised so that the rear portion 15 contacts the ground, and the front wheel pair 22 can be fully lowered. This tilts the vehicle downwardly towards the rear portion, and causes "mobile" cargo on the deck 35 to slide off the deck over the lowered ramp 32. This procedure can also be followed in water, by increasing buoyancy at the front of the vehicle by lowering the front wheels, and raising the rear wheels. When the rear portion is lower than the front portion, almost any cargo is easier to unload. Also, for loading and unloading "rigid" cargo from the vehicle, whether on land or water, the load can be suspended from a support above the vehicle, and the vehicle can be raised or lowered by actuating the wheels to receive or discharge the load. Thus, the vehicle can be considered as a self-loading and self-unloading vehicle, when used in conjunction with a passive overhead support system.

Furthermore, when the vehicle 10 is being drawn out of the water onto a hard edged shelf such as ice, or a steep bank, the forward most pair of wheels can be lowered in anticipation of the vehicle rocking forwardly and downwardly as the centre of gravity of the vehicle passes the hard edge bank. In this way, the vehicle "flips" forwardly to land on the wheels which act as shock absorbers.

In addition, when the vehicle is used in water, because the wheels are permanently mounted on the side, they serve as fenders when the vehicle is in water alongside a ship or dock. Because the wheels are independently jackable, they provide a safe, built-in system for changing wheels on land, or even in water, without the requirement for installing additional jacks. This is particularly advantageous if it is necessary to change the wheels often. If the vehicle 10 is poorly loaded so as to be unbalanced, causing a list to one side or one end, lowering the wheels at that side or end provides additional buoyancy and can assist in trimming the vehicle. Clearly, asymmetrical lowering of the wheels as above would increase drag, but where distances are relatively short, this would usually be immaterial.

In view of the above wide range of applications, it has been found that for a vehicle having dimensions as previously described, a ground clearance below the bottom 20 of about 30 cms (12 inches) from the wheels in the lowest position is desirable. To provide clearance for the wheels in the fully raised position, above the water line of about 30 cms (12 inches), it has been found that stroke of the wheels from the lowest to the highest position is approximately 130 cms (52 inches). This is approximately 0.8 diameters of the wheel, and thus, for most applications, the range of movement of the wheel from the lowest to the highest position should be between 0.5 and 1.0 diameters of the wheel. Clearly, this is necessarily approximate and will vary with the specific applications of the vehicle.

From the above, it can be seen that the vehicle according to the invention provides many advantages, and yet is mechanically quite simple and can be produced at relatively low cost. Clearly, the use of this vehicle would extend the operating range of many other amphibious vehicles apart from the patented vehicles previously described.

ALTERNATIVES

It can be seen that each recess is defined in part by at least two guide walls, and clearly additional guide walls or other guide means such as rods can be provided as needed. Similarly, each carriage comprises at least two bearing members, with each member cooperating with at least one guide wall. Preferably, the two guide walls are oppositely disposed, with each bearing means sliding along a respective guide wall, although other means to permit the wheels to be mounted for movement along generally vertically disposed guide axes can be devised.

While the invention is shown having two pairs of wheels, clearly for some applications at least one pair of wheels would function, with each wheel being located adjacent a respective side. Clearly, each side of the body would have a guide means for guiding the wheel between the raised and lowered positions thereof. Also the wheels could be powered, eg. by internal hydraulic motors, so that the vehicle can be moved independently of a tractor, at least for slow speed manoeuvering.

FIG. 5

An alternative wheel mounting means 97 is shown fitted in the side wall 18 and is a substitute for the wheel mounting means 44. The mounting means 97 has a guide means or guide frame 99 having front and rear vertically disposed guide members 101 and 102 respectively. The guide members are connected together at upper ends thereof by a connecting member 104, the member 104 carrying a rotary hydraulic motor 106.

Similarly to the guide member 55, the front guide member 101 is a channel having a generally U-sectioned guide wall 108 having a transversely disposed central wall 110 and a pair of oppositely facing longitudinal side walls 111 and 112. The rear guide member 102 is generally similar to the member 101. Similarly to the previously described embodiment, the guide members 101 and 102 and inner and outer wall portions (not shown), similar to the wall portions 58 and 59, define in part a recess 115.

A carriage 118 has front and rear parallel bearing members 121 and 122 respectively, the members having an outer shape generally complementary to the respective U-sectioned guide wall 108. A central member 124 is disposed between the members 121 and 122, and parallel upper and lower spacer members 127 and 128 interconnect the three members 121, 122 and 124 to provide a rigid framework for the carriage as previously described. As before, a stub axle 131 and a strengthening gusset 132 extend outwardly from the carriage to journal the wheel, the wheel being omitted.

A lead screw 134 having a vertically disposed longitudinal axis 135 extends between the carriage 118 and the hydraulic motor 106, and is powered for rotation by the motor 106. An internal thread means 138, shown in broken outline, is mounted in the carriage and engages the lead screw 134. Clearance is provided below the thread means 138 to receive the lead screw when the carriage means moves to an upper position. Clearly, rotation of the lead screw by the motor 106 moves the carriage 118 longitudinally between upper and lower positions thereof. Preferably, a protecting, flexible upper bellows 140 extends between the thread means 138 and the connecting member 104 and a lower flexible bellows, not shown, extends below the thread means 138 to protect the thread of the lead screw. Similarly, the internal thread means 138 is preferably in a sealed lubricated container to reduce corrosion problems.

Clearly, the lead screw 134, the motor 106 and thread means 108 serve as an actuating means for moving the support means along a parallel axis of the guide means and are equivalent to the cylinder 87. Clearly, the hydraulic motor serves as a rotating means to provide relative rotation between the lead screw and the internal thread means to move the carriage means along the screw. Alternative means could be provided, for example a fixed lead screw with a rotating internal thread means could be substituted, and many other variations of means to move the carriage are possible.

What is claimed is:
1. An amphibious vehicle comprising:
(a) a body having front and rear portions, opposite sides and a bottom, the bottom curving smoothly upwardly at the front and rear portions of the body;
(b) at least one pair of wheels, each wheel being located adjacent a respective side;

(c) at least one pair of wheel mounting means for moving the respective wheel between raised and lowered positions thereof, so that when in the raised position thereof, lower portions of the wheels are raised above the said bottom, and when in the lowered position thereof, the lower portions of the wheels are below the said bottom, each wheel mounting means including:

each side of the body having a guide means for guiding the wheel, each guide means comprising a recess within the respective side of the body, each recess being defined in part by oppositely facing, generally U-sectioned guide walls, each guide wall having a transversely disposed central wall, and a pair of oppositely facing longitudinal side walls, clearance being provided between the side walls adjacent an outside of the body, a support means for mounting the wheel for rotation relative thereto, the support means cooperating with the guide means for moving therealong between raised and lowered positions of the wheel, the support means comprising a carriage fitted within the recess, and a wheel journalling means cooperating with the carriage to permit rotation of the wheel relative to the carriage, each carriage comprising a pair of two bearing members having an outer shape generally complementary to the respective U-sectioned guide wall, the said wheel journalling means extending from the carriage through the clearance between the side walls, actuating means for moving the carriage along the guide means between the raised and lowered positions, the actuating means cooperating with the body and the carriage; and (d) the bottom of the vehicle has a low friction, wear-resisting plastic composition extending between the sides of the body and between upper portions of the bottom.

2. An amphibious vehicle comprising:
(a) a body having front and rear portions, opposite sides and a bottom, the bottom curving smoothly upwardly at the front and rear portions of the body;
(b) at least one pair of wheels, each wheel being located adjacent a respective side;
(c) at least one pair of wheel mounting means for moving the respective wheel between raised and lowered positions thereof, so that when in the raised position thereof, lower portions of the wheels are raised above the said bottom, and when in the lowered position thereof, the lower portions of the wheels are below the said bottom, each wheel mounting means including:

each side of the body having a guide means for guiding the wheel, each guide means comprising a recess within the respective side of the body, each recess being defined in part by at least two guide walls, a support means for mounting the wheel for rotation relative thereto, the support means cooperating with the guide means for movement therealong between raised and lowered positions of the wheel, the support means comprising a carriage fitted within the recess, and a wheel journalling means cooperating with the carriage to permit rotation of the wheel relative to the carriage, each carriage comprises at least two bearing members, each member cooperating with at least one of said guide walls, a low friction, wear-resistant plastic composition provided between at least one of said guide walls and the bearing member, actuating means for moving the carriage along the guide means between the raised and lowered positions, the actuating means cooperating with the body and the carriage; and (d) the bottom of the vehicle has a low friction, wear-resisting plastic composition extending between the sides of the body and between upper portions of the upwardly curving front and rear portions of the bottom.

3. An amphibious vehicle comprising:
(a) a body having front and rear portions, opposite sides and a bottom, the bottom curving smoothly upwardly at the front and rear portions of the body;
(b) at least one pair of wheels, each wheel being located adjacent a respective side;
(c) at least one pair of wheel mounting means for moving the respective wheel between raised and lowered positions thereof, so that when in the raised position thereof, lower portions of the wheel are raised above the said bottom, and when in the lowered positions thereof, the lower portions of the wheels are below the said bottom, each mounting means including:

each side of the body having a guide means for guiding the wheel, each guide means comprising a recess within the respective side of the body, the guide means having a guide axis, a support means for mounting the wheel for rotation relative thereto, the support means cooperating with the guide means for movement along the guide axis between the raised and lowered positions of the wheel, the support means comprising a carriage fitted within the recess, and wheel journalling means cooperating with the carriage to provide rotation for a wheel mounted thereon, actuating means for moving the carriage along the guide means between the raised and lowered positions, the actuating means cooperating with the body and the carriage, the actuating means being a hydraulic cylinder having a cylinder body and a piston rod, the rod and cylinder body cooperating telescopically so as to be mutually linearly extensible and retractable along the actuator axis, the cylinder body being positioned to permit the rod to extend upwardly therefrom, connecting means extending from the rod outwardly to the carriage so that actuation of the rod moves the carriage with respect to the guide means; and (d) the bottom of the vehicle has a low friction, wear-resisting plastic composition extending between the sides of the body of the vehicle and between upper portions of the upwardly curved front and rear portions of the bottom.

4. An amphibious vehicle comprising:
(a) a body having front and rear portions, opposite sides and a bottom, the bottom curving smoothly upwardly at the front and rear portions of the body;
(b) at least one pair of wheels, each wheel being located adjacent a respective side;

(c) at least one pair of wheel mounting means for moving the respective wheel between raised and lowered positions thereof, so that when in the raised position thereof, lower portions of the wheels are raised above the said bottom, and when in the lowered position thereof, the lower portions of the wheels are below the said bottom, each wheel mounting means including:

each side of the body having a guide means for guiding the wheel, each guide means comprising a recess within the respective side of the body, the guide means having a guide axis, a support means for mounting the wheel for rotation relative thereto, the support means cooperating with the guide means for movement therealong between raised and lowered positions of the wheel, the support means comprising a carriage fitted within the recess, and wheel journalling means cooperating with the carriage to provide rotation for a wheel mounted thereon, the carriage mounting an internal thread means, actuating means for moving the carriage along the guide means between the raised and lowered positions, the actuating means cooperating with the body and the support means, the actuator means being a lead screw having a central longitudinal axis disposed vertically to extend through the recess, the lead screw engaging the said internal thread means mounted on the carriage, rotating means to provide relative rotation between the lead screw and the internal thread means to move the carriage along the axis of the lead screw; and (d) the bottom of the vehicle has a low-friction, wear-resisting plastic composition extending between the sides of the body and between upper and lower portions of the upwardly curved front and rear portions of the bottom.

5. A vehicle as claimed in claim 4, in which the rotating means is a hydraulic motor mounted on a connecting means of the recess, and adapted to rotate the lead screw.

6. A vehicle as claimed in claim 4, in which:
(a) the wheels can be raised or lowered independently of each other.

7. A vehicle as claimed in claim 4, in which:
(a) the vehicle has a second pair of wheels in addition to the said one pair of wheels.

8. A vehicle as claimed in claim 7, in which:
(a) the four wheels can be raised or lowered independently of each other.

9. A vehicle as claimed in claim 4, in which:
(a) the rear portion of the vehicle has a loading ramp having a hinge along a forward edge thereof so as to hinge the ramp to the body to permit swinging between a raised position and a lowered position of the ramp.

10. A vehicle as claimed in claim 4, in which:
(a) the bottom is flat,
b) the front and rear portions are inclined upwardly and longitudinally outwardly.

11. A vehicle as claimed in claim 4, in which:
(a) the wheels can be set remotely to any position between fully raised and fully lowered positions.

12. An amphibious vehicle comprising:
(a) a body having front and rear portions, opposite sides and a bottom,
(b) at least one pair of wheels, each wheel being located adjacent a respective side,
(c) at least one pair of wheel mounting means for moving the respective wheel between raised and lowered positions thereof, so that when in the raised positions thereof, lower portions of the wheels are raised above the said bottom, and when in the lowered positions thereof, the lower portions of the wheels are below the said bottom, each wheel mounting means including:
(i) each side of the body having a guide means for guiding the wheel, each guide means having a guide axis,
(ii) a support means for mounting the wheel for rotation relative thereto, the support means cooperating with the guide means for movement along the guide axis between raised and lowered positions of the wheels,
(iii) actuating means for moving the support means along the guide means between the raised and lowered positions, the actuating means cooperating with the body and the support means and being longitudinally extensible and retractable along an actuator axis which is disposed parallel to the guide axis.

13. A vehicle as claimed in claim 12, in which:
(a) the bottom of the vehicle has a low friction, wear resisting plastic composition.

14. A vehicle as claimed in claim 13, in which:
(a) the plastic composition is UHMW polyethylene.

15. A vehicle as claimed in claim 12, in which:
(a) each guide means comprises a recess within the respective side of the hull,
(b) the support means comprises a carriage fitted within the recess, and wheel journalling means cooperating with the carriage to provide rotation for a wheel mounted thereon,
(c) the actuating means is a hydraulic cylinder having a cylinder body and a piston rod, the rod and cylinder cooperating telescopically so as to be mutually linearly extensible and retractable along the actuator axis, the body being positioned to permit the rod to extend upwardly vertically therefrom,
(d) connecting means extending from the rod outwardly to the carriage, so that actuation of the rod moves the carriage with respect to the guide axis.

16. A vehicle as claimed in claim 12, in which:
(a) the wheels are mounted to extend outwardly from respective sides of the body so that, when the vehicle is floating on water, the wheels can act as fenders to reduce damage by contacting with other objects, and when immersed in the water provide laterally spaced floatation to increase rolling resistance and thus increase stability of the vehicle.

17. A vehicle as claimed in claim 12, in which:
(a) the vehicle has a second pair of wheels in addition to the said one pair of wheels,
(b) the four wheels can be raised or lowered independently of each other.

18. A vehicle as claimed in claim 12, in which:
(a) the wheels can be set remotely to any position between fully raised and fully lowered positions.

19. An amphibious vehicle comprising:
(a) a body having front and rear portions, opposite sides and a bottom,
(b) at least one pair of wheels, each wheel being located adjacent a respective side,
(c) at least one pair of wheel mounting means for moving the respective wheel between raised and lowered positions thereof, so that when in the raised position, lower portions of the wheels are raised above the said bottom, and when in the lowered position thereof the lower portions of the wheels are below the said bottom, each wheel mounting means including:

(i) each side of the body having a guide means for guiding the wheel, each guide means comprising a recess within the respective side of the body, each recess being defined in part by oppositely facing, generally U-sectioned guide walls, each guide wall having a transversely disposed central wall, and a pair of oppositely facing longitudinal sidewalls, clearance being provided between the side walls and adjacent an outside of the body, (ii) a support means for mounting the wheel for rotating relative thereto, the support means co-operating with the guide means for movement therealong between raised and lower positions of the wheel, the support means comprising a carriage fitted within the recess, and a wheel journalling means cooperating with the carriage to permit rotation of the wheel relative to the carriage, each carriage comprising a pair of two bearing members having an outer shape generally complementary to the respective U-sectioned guide walls, each wheel journalling means extending from the carriage through the clearance between the sidewalls, (iii) actuating means for moving the support means along the guide means between the raised and lowered positions, the actuating means cooperating with the body and the support means.

20. A vehicle as claimed in claim 19 in which each recess includes a low friction, wear resisting plastic composition provided between at least one of said guide walls and the bearing member.

21. An amphibious vehicle comprising:
(a) a body having front and rear portions, opposite sides and a bottom,
(b) front and rear pairs of wheels spaced longitudinally apart, a wheel of each pair being located adjacent a respective side, each wheel being fitted with relatively large all-terrain flotation tires,
(c) at least one pair of wheel mounting means for moving the respective wheel generally vertically between raised and lowered positions thereof so as to maintain essentially constant longitudinal positions of the wheels with respect to the body for all positions of the wheels, so that when in the raised positions thereof, lower portions of the wheels are raised above the said bottom, and when in the lowered positions thereof the lower portions of the wheels are below the said bottom, and when immersed in water, the longitudinal spacing between the lowered wheels increases pitching resistance, and
(d) the wheels being located to be spaced laterally outwardly from the respective sides of the body so that, when the vehicle is floating on water, the wheels can act as fenders to reduce damage by contacting with other objects, and when immersed in the water the lateral spacing of the wheels provides laterally spaced flotation to increase rolling resistance, and thus increase stability of the vehicle.

22. A vehicle as claimed in claim 21, in which each wheel has a range of motion between the said raised and lowered positions of the wheel of between 0.5 and 1.0 wheel diameters.

* * * * *